US005357106A

United States Patent [19]
Wilson

[11] Patent Number: 5,357,106
[45] Date of Patent: Oct. 18, 1994

[54] SENSOR FOR DETECTING BEAM POSITION AND START OF SCAN POSITION

[75] Inventor: James M. Wilson, Glendora, Calif.

[73] Assignee: Xerox Corporation, Stamford, Conn.

[21] Appl. No.: 130,253

[22] Filed: Oct. 1, 1993

[51] Int. Cl.$^5$ .............................................. H01J 3/14
[52] U.S. Cl. ................................ 250/236; 358/481
[58] Field of Search ................ 250/208.6, 235, 236; 359/218, 219, 220; 358/481

[56] References Cited

U.S. PATENT DOCUMENTS

| | | | |
|---|---|---|---|
| 3,649,840 | 3/1972 | Thorn et al. | 250/231 |
| 4,675,517 | 6/1987 | Shiomi | 250/201 |
| 4,950,888 | 8/1990 | Hamada | 250/236 |
| 5,081,544 | 1/1992 | Kikuchi et al. | 250/236 |

*Primary Examiner*—David C. Nelms
*Assistant Examiner*—K. Shami
*Attorney, Agent, or Firm*—Fariba Rad

[57] ABSTRACT

A sensor for a raster scanner is disclosed which utilizes two elements to detect the position of a scanning light beam relative to a reference level and also detect the start of the scan position. The two elements are placed adjacent to each other in such a manner that on a reference axis, the width of both elements are equal. Each element will have a varying distance between its edges scanned by a spot and such distance on one element will be different than the corresponding distance in the direction of scan on the other element except at the reference axis. Depending on the distances traveled by the light beam on each of the elements, the position of the light beam relative to the reference axis will be detected. The two edges of each element that are adjacent to each other, separating the two elements, must be parallel to each other and orthogonal to the scan direction to also use the crossing of the edges by a light beam as a start of scan detector.

2 Claims, 20 Drawing Sheets

SENSOR FOR DETECTING BEAM POSITION AND START OF SCAN POSITION

BACKGROUND OF THE INVENTION

This application relates to U.S. application Ser. No. 08/130,580, "Wobble Correction by Dual Spot Pixel Intensity Proportioning" (Common Assignee) Filed concurrently herewith.

This invention relates to a sensor for a raster scanning system, and more particularly, to a raster scanning system which utilizes two elements to detect the position of a scanning light beam relative to a reference level and also detect the start of the scan position.

Referring to FIG. 1, a conventional raster scanning system utilizes a light source 12, a collimator 14, a pre-polygon optics 16, a multi-faceted rotating polygon mirror 18 as the scanning element, a post polygon optics 20 and a photosensitive medium 22. The light source 12, which can be a laser source, produces a light beam 24 and sends it to the polygon 18 through the collimator 14 and the pre-polygon optics 16. The rotating polygon has a plurality of facets 26, each of which is a plane mirror. The facets 26 of the rotating polygon mirror 18 reflect the light beam 24 and also cause the reflected light 24 to revolve about an axis near the center of rotation of the rotating polygon mirror 18 scanning a line. This reflected light beam can be utilized to scan a document at the input end of an imaging system as a raster input scanner or can be used to impinge upon a photographic film or a photosensitive medium 22, such as a xerographic drum at the output of the imaging system.

SUMMARY OF THE INVENTION

It is an object of this invention to detect the position of a scanning light beam relative to a reference axis by utilizing a sensor which comprises two elements. The two elements are placed adjacent to each other in such a manner that on a reference axis, the width of both elements are equal. Each element will have a varying distance between its edges scanned by a spot and such distance on one element will be different than the corresponding distance in the direction of scan on the other element except at the reference axis. Depending on the distances traveled by the light beam on each of the elements, the position of the light beam relative to the reference axis will be detected.

It is another object of this invention to detect the start of the scan position by utilizing the above sensor. The edges of each element that are adjacent to each other, separating the two elements, must be parallel to each other and orthogonal to the scan direction to also use the crossing of the edges by a light beam as a start of scan detector.

DESCRIPTION OF THE PREFERRED EMBODIMENT

Figure 2:
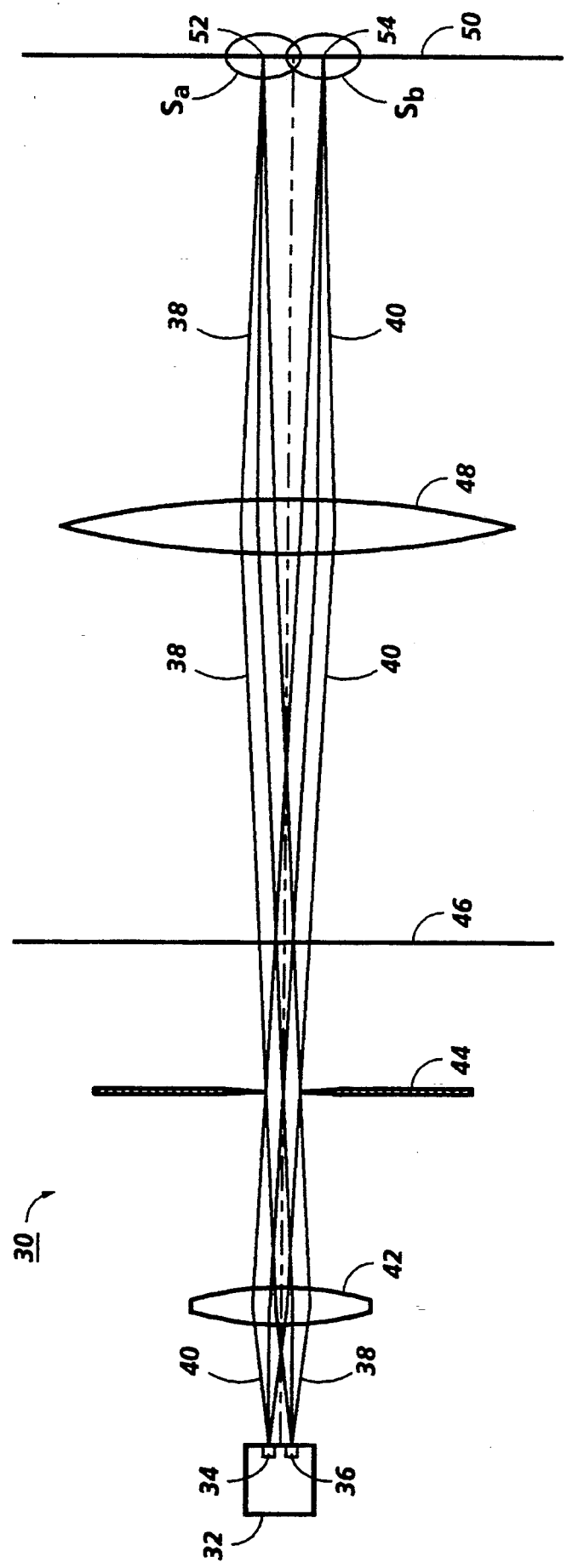
FIG. 2 shows cross-scan view of a raster scanning system of this invention.

Referring to FIG. 2, there is shown a raster scanning system 30 of this invention. The raster scanning system 30 contains a laser light source 32 which has two diodes 34 and 36 for emitting two light beams 38 and 40. The two light beams pass through a collimating lens 42 to be collimated and then they pass through an aperture 44. Aperture 44 clips the two light beams to the desired diameter. The two clipped light beams strike a facet 46 of a polygon. For simplicity, the facet 46 of the polygon is shown as a line and the light beams reflected from the polygon have been unfolded and are shown as continuous light beams. A F-theta lens 48 receives the two light beams reflected by the facet 46 and images them onto the a photoreceptor 50.

FIG. 2 shows only the path for the rays which emerge from the centers of the diodes 34 and 36 and image the centers 52 and 54 of the spots Sa and Sb on the photoreceptor plane 50. However, it should be noted that the two diodes 34 and 36 and the two light beams 38 and 40 each has a finite diameter and therefore when the two light beams 38 and 40 are imaged on the photoreceptor plane 50, they create two spots Sa and Sb. As it can be observed, the two light beams 38 and 40 are utilized in such a manner that they create two overlapping spots Sa and Sb on the photoreceptor plane 50.

In order to apprehend this invention, it is necessary to study the combination of two light beams and the effects of the intensity variation of each light beam or both light beams on the resulting spot through their Gaussian distributions.

Figure 3:
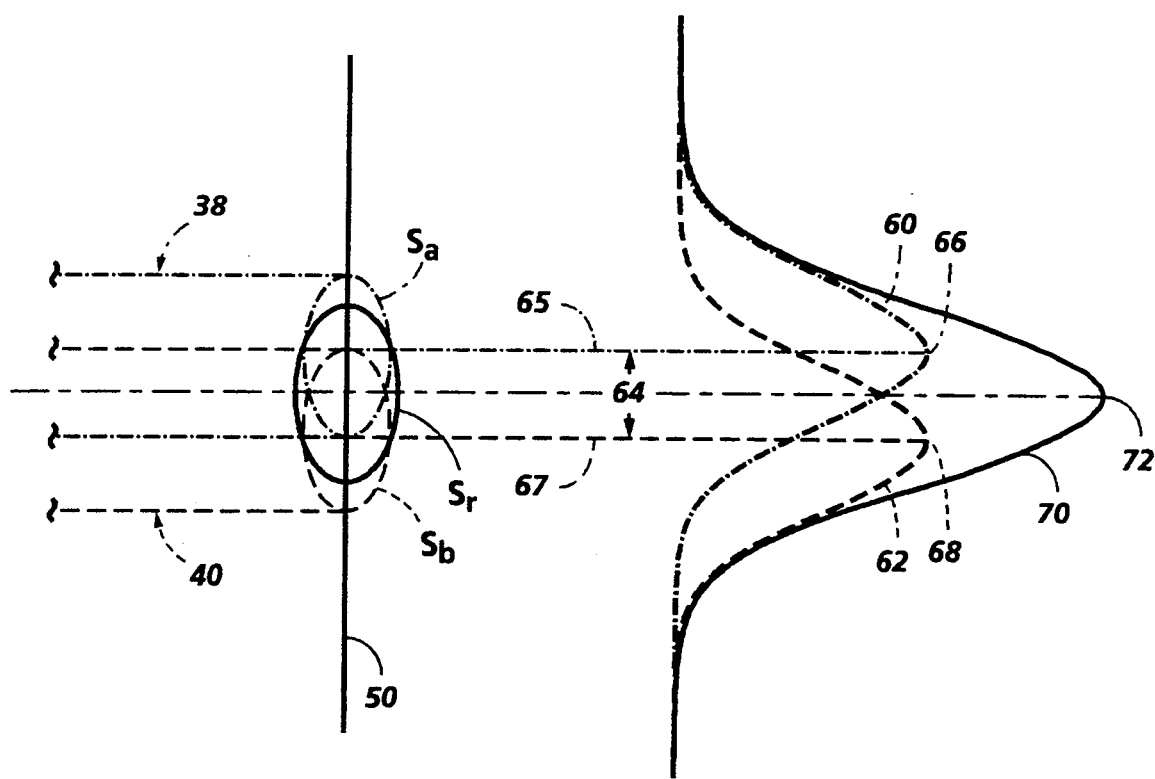
FIG. 3 shows the two light beams of FIG. 2 when they strike the photoreceptor along with their Gaussian distributions and the Gaussian distribution of the resulting light beam.

Referring to FIG. 3, there is shown a magnified portion of FIG. 2 in which the two light beams 38 and 40 each individually generate a spot in the absence of the other beam. As the light beams 38 and 40 individually strike the photoreceptor plane 50, they individually generate spots Sa and Sb respectively. When the two light beams overlap, in effect they become one light beam which hereinafter it will be called "resulting light beam". Also, when the resulting light beam strikes a plane, it generates one spot which hereinafter it will be called "resulting spot". The size of the resulting spot Sr is substantially equal to the size of the spot Sa or Sb generated by a single beam 38 or 40 respectively at its maximum intensity.

FIG. 3 also shows two Gaussian distributions 60 and 62 corresponding to two light beams 38 and 40 respectively along with the Gaussian distribution 70 of the resulting beam. If the two light beams 38 and 40 partially overlap in such a manner that the distance 64 between the peak 66 of the Gaussian distribution 60 and the peak 68 of the Gaussian distribution 62 is equal to Full Width Half Max of a single light beam at its maximum intensity divided by 2 (FWHM/2), then the resulting light beam will have a substantially Gaussian distribution 70. Full width half max (hereinafter referred to as "FWHM") is the width of the Gaussian distribution at half of the maximum intensity. Hereinafter, the distance between the two peaks of the Gaussian distributions of the two light beams will be called "spot separation".

If the intensities of the two light beams 38 and 40 are kept equal, then the resulting spot Sr will have a center at the mid point between the two center rays 65 and 67 of the two light beams 38 and 40 respectively. However, if the intensities of the two light beams are different, the center of the resulting spot Sr will be closer to the center ray of the light beam with the higher intensity. The distance between the center of the resulting spot and the center ray of the light beam with the higher intensity depends on the difference between the two intensities of the two light beams.

It should be noted that for a single beam, the effective spot size is equal to FWHM. Also, when two light beams are combined in such a manner that the distance between the peak of the two light beams is equal to FWHM/2 of a single beam with maximum intensity, then the resulting light beam will have a spot size equal to the spot size (FWHM) of a single light beam with maximum intensity. It should also be noted that in combining two light beams, the sum of the intensities of the two light beams should be kept equal to the maximum intensity of a single light beam.

Figure 4:
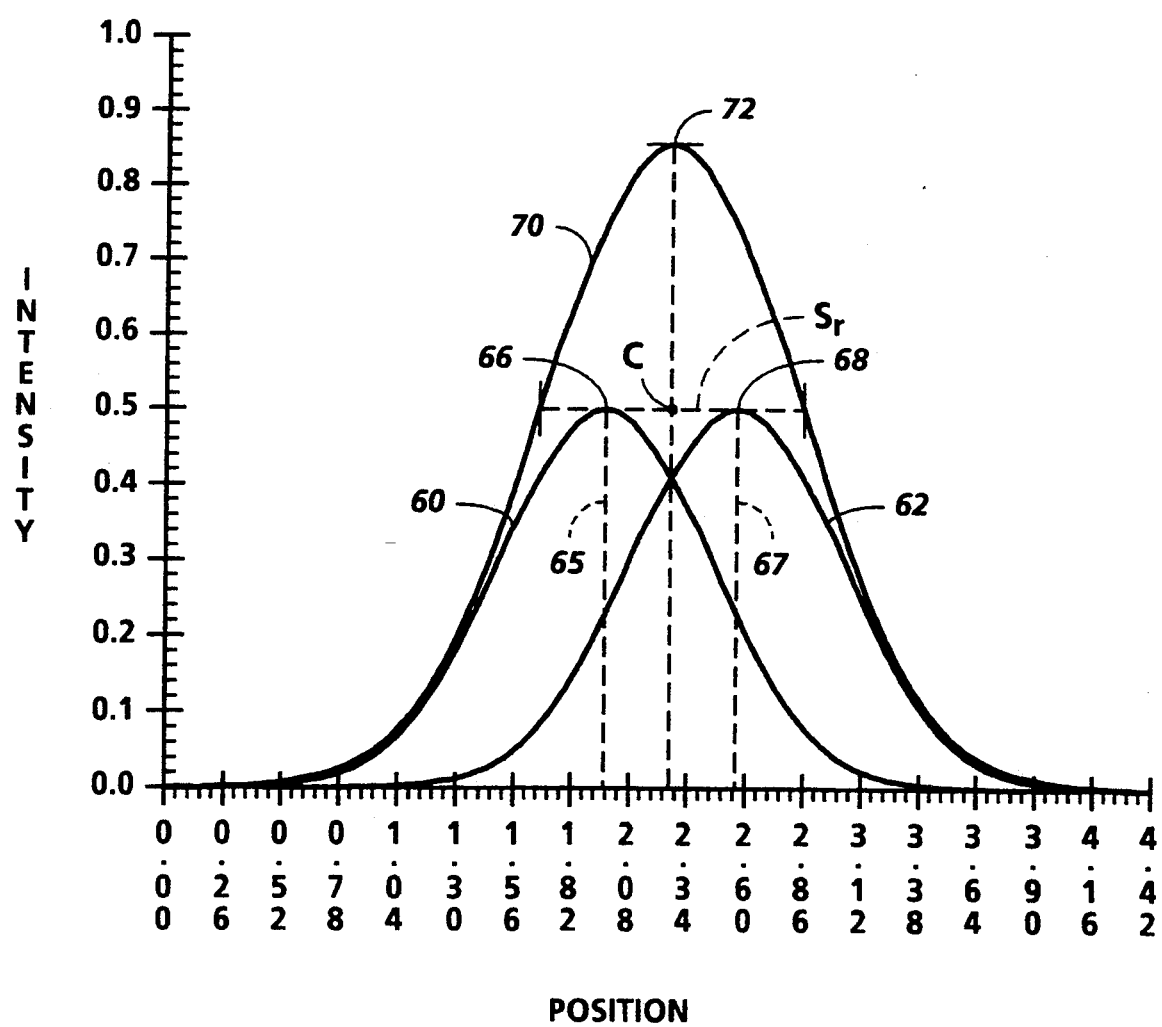
FIG. 4 shows the Gaussian distribution of two light beams 38 and 40 of FIG. 3 at 50% of their maximum intensities and the Gaussian distribution of their resulting light beam.

Referring to FIGS. 4 through 8, there are shown different examples of combining two light beams 38 and 40 of FIGS. 2 and 3 with different intensities. In all FIGS. 4 through 8, the horizontal axes represent the position of light beams and the vertical axes represent the intensity of the light beams. Also, in all FIGS. 4 through 8, the Gaussian distributions 60, 62 and 70 correspond to the light beam 38, light beam 40 and the resulting light beam respectively. In FIG. 4, the light beam 38 has 50% of its maximum intensity and the light beam 40 has 50% its maximum intensity. In this case, the center C of the resulting spot Sr is at the mid point between the two center rays 65 and 67 of the light beams 38 and 40 respectively.

Figure 5:
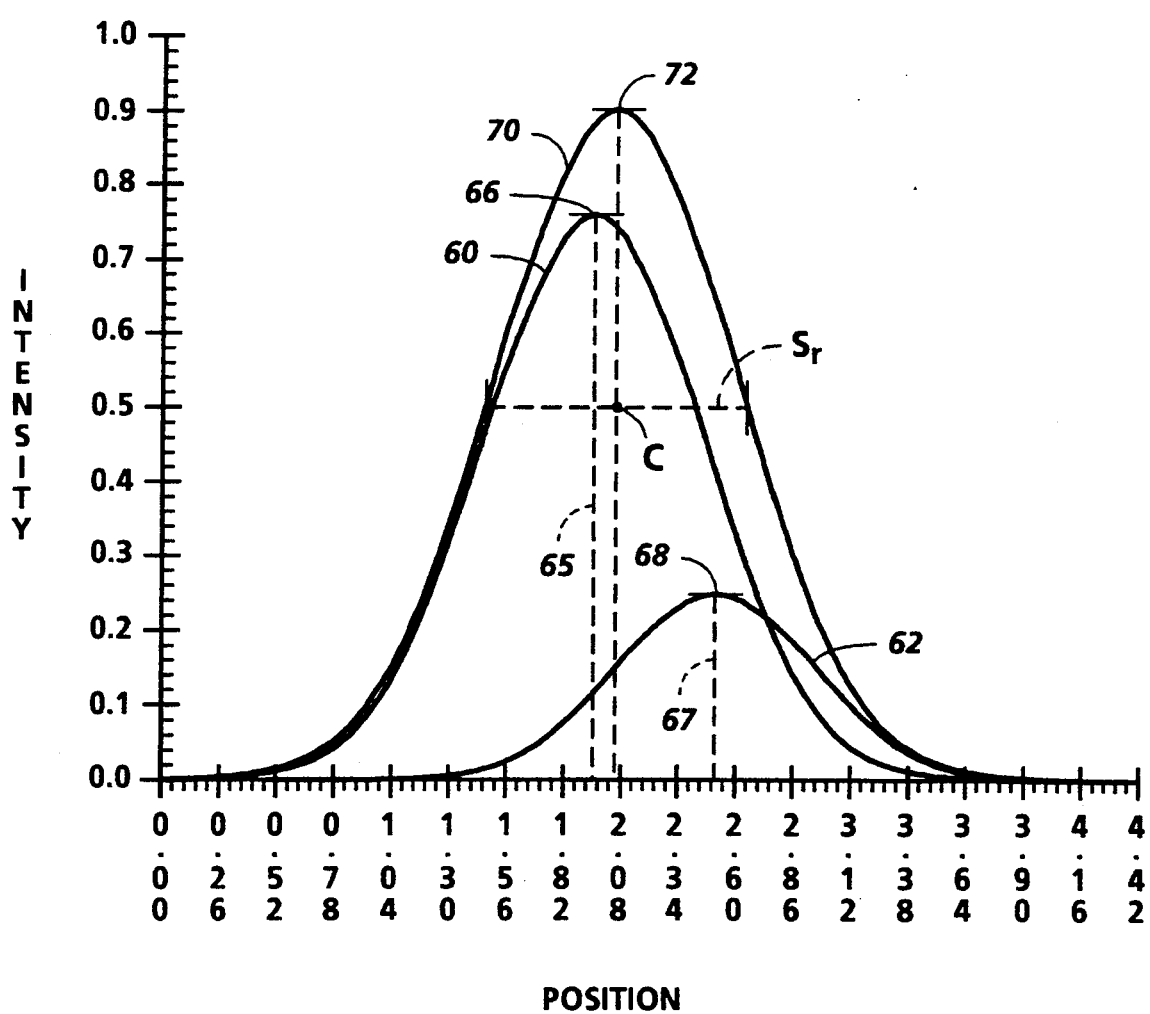
FIG. 5 shows the Gaussian distribution of the light beam 38 of FIG. 3 at 75% of its maximum intensity and the Gaussian distribution of the light beam 40 of FIG. 3 at 25% of its maximum intensity along with the Gaussian distribution of their resulting light beam.

Referring to FIG. 5, the light beam 38 has 75% of its maximum intensity and the light beam 40 has 25% of its maximum intensity. In this case, the resulting light beam will have a higher intensity than the intensity of the individual light beams 38 and 40. Also, the resulting spot Sr will have a center C closer to the center ray 65 of the light beam 38 which has higher intensity. Comparing FIGS. 4 and 5, it can be observed that by changing the intensity of the two combined light beams 38 and 40 the resulting spot has moved to a location closer to the light beam 38 with higher intensity.

Figure 6:
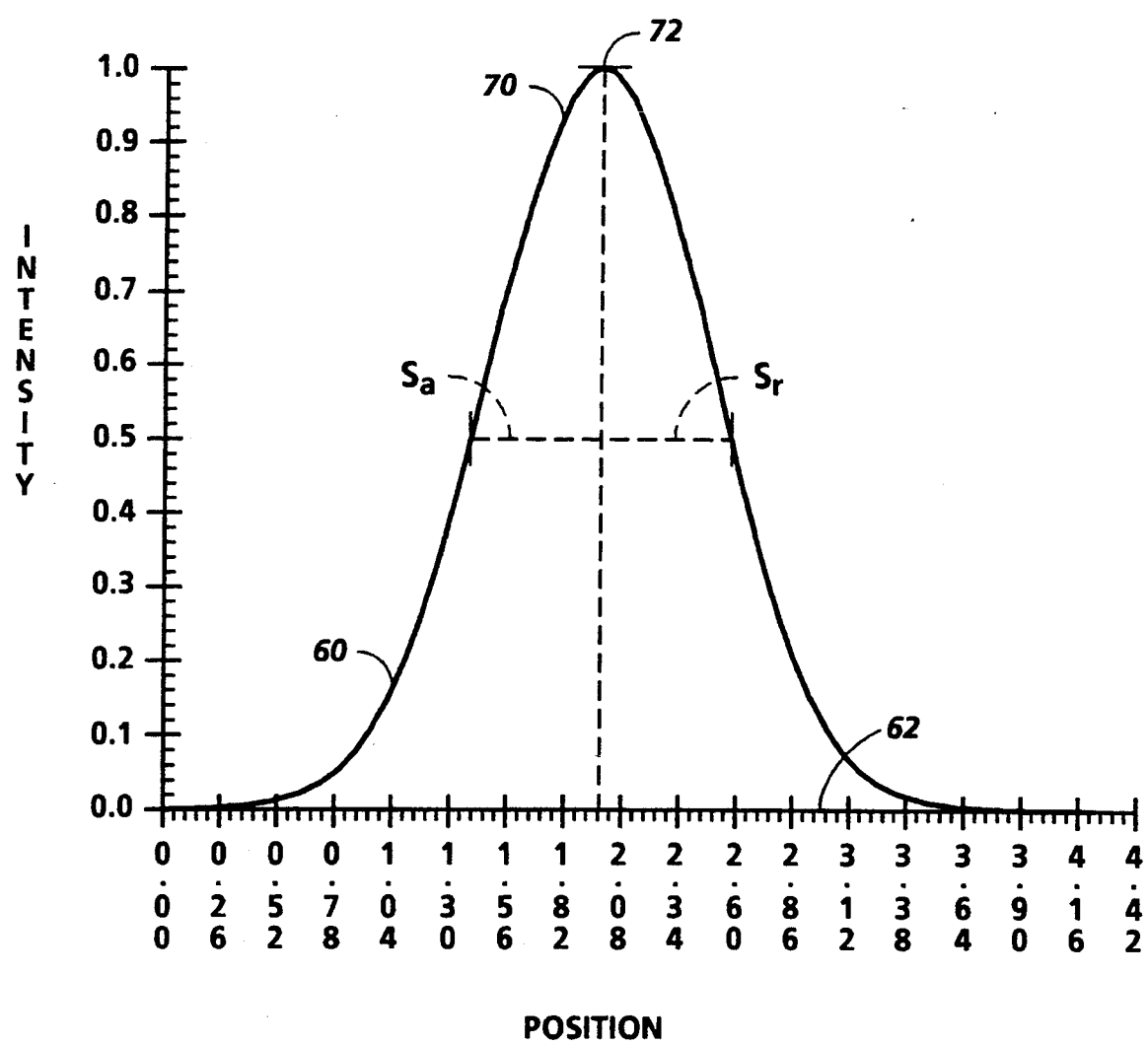
FIG. 6 shows the Gaussian distribution of a single light beam 38 of FIG. 3 at 100% of its maximum intensity.

In FIG. 6, the Gaussian distribution 60 of the light beam 38 is shown with full intensity and the Gaussian distribution 62 of the light beam 40 is shown with zero intensity meaning that the light beam 40 is turned OFF. In this case, since there is only one beam 38 ON, the Gaussian distribution 70 of the resulting light beam will be the same as the Gaussian distribution 60 of the light beam 38. Also, the spot Sa generated by the light beam 38 will be the resulting spot Sr.

Figure 7:
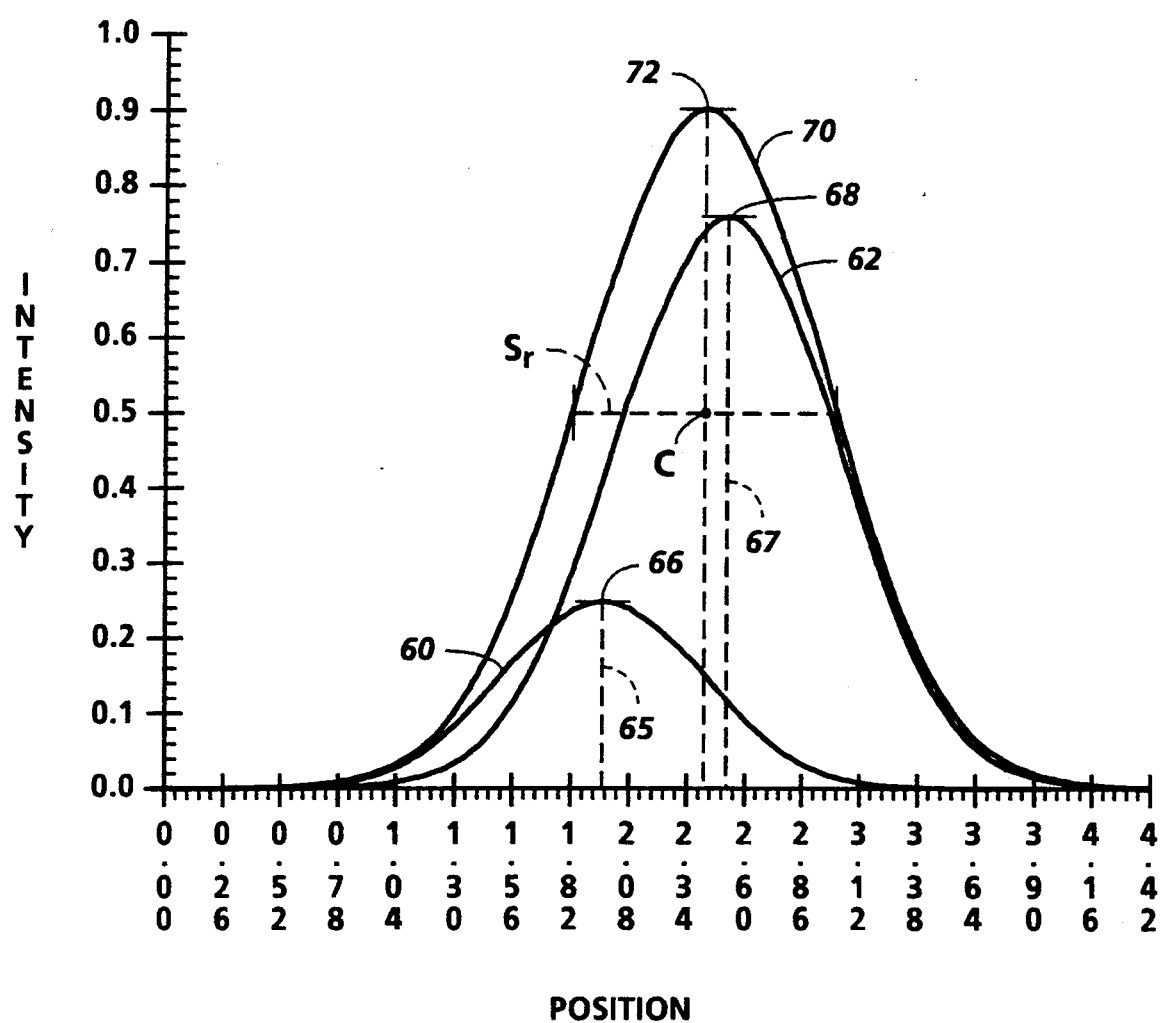
FIG. 7 shows the Gaussian distribution of the light beam 38 of FIG. 3 at 25% of its maximum intensity and the Gaussian distribution of the light beam 40 of FIG. 3 at 75% of its maximum intensity along with the Gaussian distribution of their resulting light beam.

Referring to FIG. 7, the light beam 38 has 25% of its maximum intensity and the light beam 40 has 75% of its maximum intensity. In this case, the resulting light beam will have a higher intensity than the intensity of the individual light beams 38 and 40. Also, the resulting spot Sr will have a center C closer to the center ray 67 of the light beam 40 which has higher intensity. Comparing FIGS. 4 and 7, it can be observed that by changing the intensity of the two combined light beams 38 and 40 (FIG. 3) the resulting spot has moved to a location closer to the light beam 40 with higher intensity.

Figure 8:
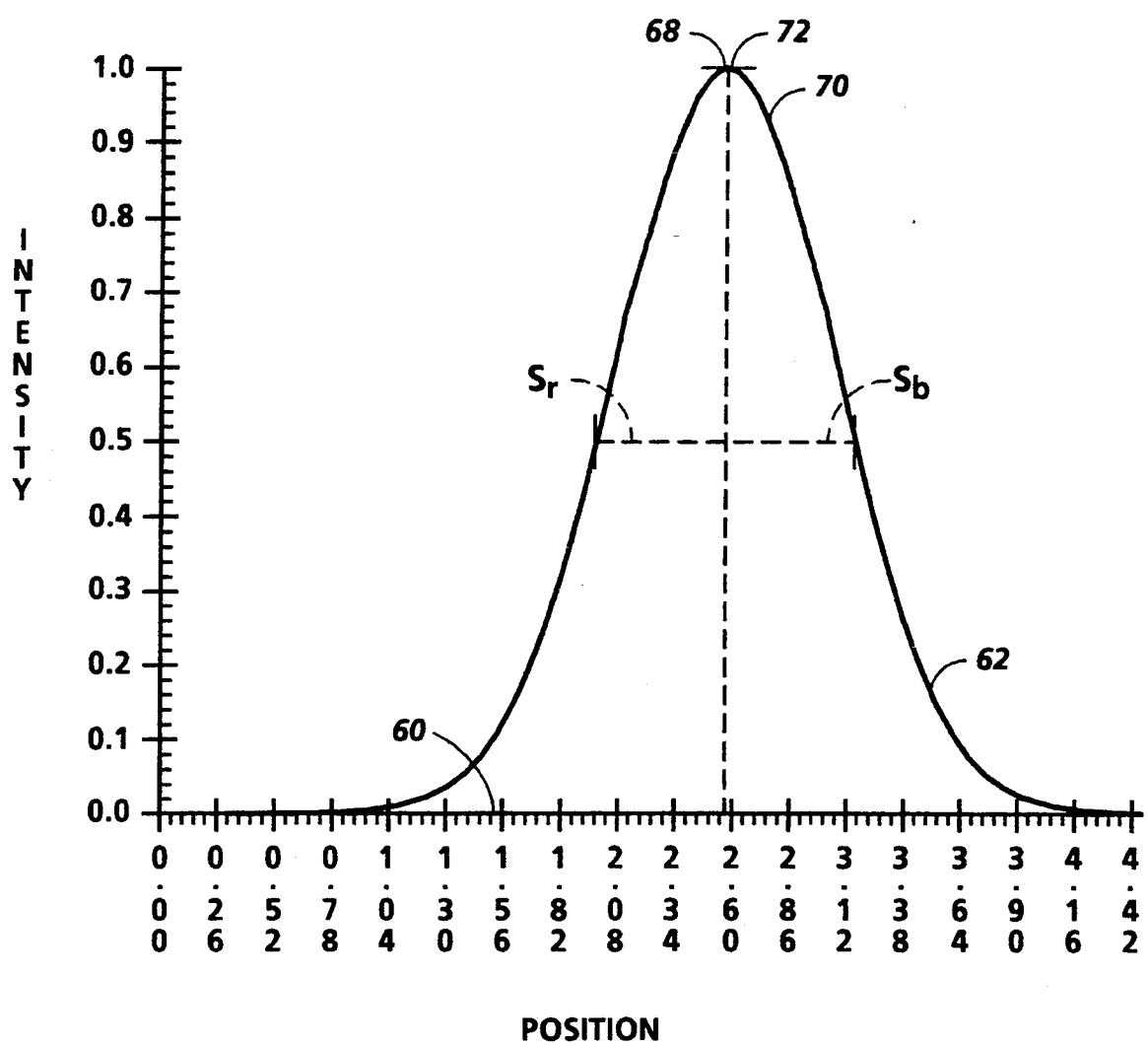
FIG. 8 shows the Gaussian distribution of a single light beam 40 of FIG. 3 at 100% of its maximum intensity.

Finally, referring to FIG. 8, the light beam 40 has full intensity and the light beam 38 has zero intensity meaning that the light beam 38 is turned OFF. In this case, since there is only one beam 40 ON, the Gaussian distribution 70 of the resulting light beam will be the same as the Gaussian distribution 60 of the light beam 38. Also, the spot Sb generated by the light beam 40 will be the resulting spot Sr.

In all the above examples, the size of the resulting spot Sr is substantially equal to the size of a spot generated by a single light beam such as Sa or Sb (FWHM) at its maximum intensity. Also, it should be noted that the spot size on the Gaussian distribution of the resulting light beam is shown on the 0.5 line which is where the spot size of the single light beam with a maximum intensity is shown.

The concept of combining two light beams can be utilized to correct a wobble in a raster scanner system. By utilizing two light beams to scan two partially overlapping paths on a photoreceptor and by adjusting the intensity of the two light beams, the resulting scan line can be moved to substantially reduce the wobble.

It should be noted that in the embodiment of this invention, the beams are not combined and one beam will always follow the other beam. However, the two paths that the two light beams scan partially overlap each other and therefore the result on the photoreceptor plane will be as if the two light beams were combined to scan one line.

It should also be noted that when two light beams are combined in such a manner that the spot separation between the two beams is FWHM/2, the maximum wobble correction that can be achieved is ½ pixel. A raster scanner with wobble correcting optics which partially corrects the wobble can utilize a dual beam laser diode to further correct the partially corrected wobble.

It should be noted that the ½ pixel limit on the wobble correction is based on using only two diodes. However, if more than ½ pixel wobble correction is needed, more diodes can be utilized to generate more light beams in which for any given scan line either one diode or only two diodes will be on to generate two light beams which scan two partially overlapping paths. The design and the operation of multiple diodes will be discussed further on.

Figure 9:
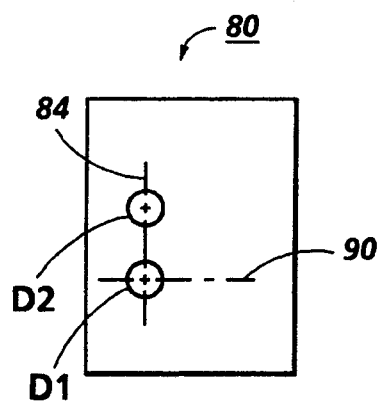
FIG. 9 shows a front view of a laser light source with a vertical diode arrangement.
Figure 10:
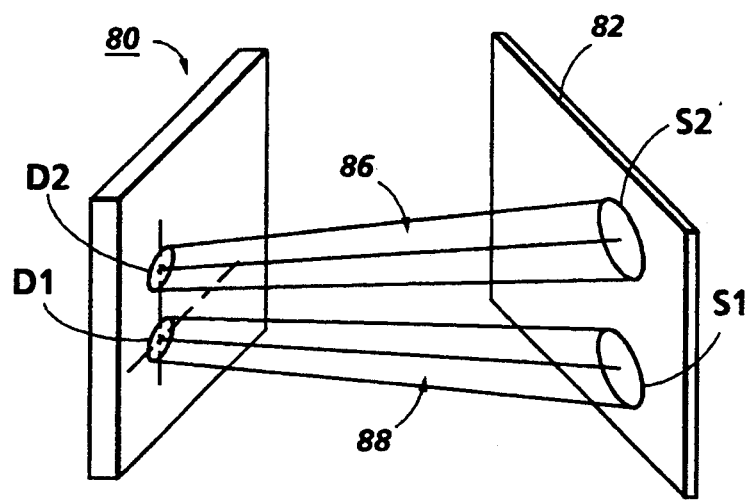
FIG. 10 shows a perspective view of the light source of FIG. 9 which generates two spots on a photoreceptor plane.
Figure 11:
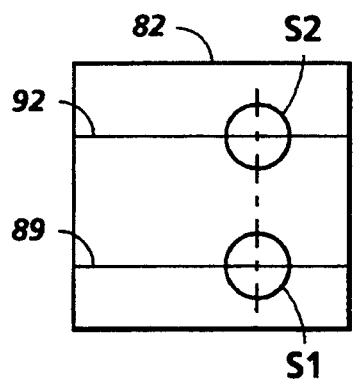
FIG. 11 shows a front view of the photoreceptor plane of FIG. 10.

To combine two light beams, it is necessary to study different positions of the diodes on a laser light source. Referring to FIGS. 9, 10 and 11, there are shown a front view of a laser light source 80 with two diodes D1 and D2, a perspective view of the light source 80 which generates two spots S1 and S2 on a photoreceptor plane 82 and a front view of the photoreceptor plane 82 respectively. It should be noted that for simplicity, the optical elements between the diodes D1 and D2 and the photoreceptor plane 82 are not shown. As it can be observed the two diodes D1 and D2 are located on a vertical axis 84. In this arrangement the two diodes D1 and D2 generate two light beams 86 and 88 and the two light beams 86 and 88 generate the two spots S1 and S2 on the photoreceptor plane 82. Referring to FIG. 11, it can be observed that the two spots scan two different paths 89 and 92 without overlapping each other. Therefore, since the two paths 89 and 92 do not overlap, the positions of the two diodes D1 and D2 shown in FIGS. 9 and 10 are not appropriate positions for combining two light beams.

Figure 12:
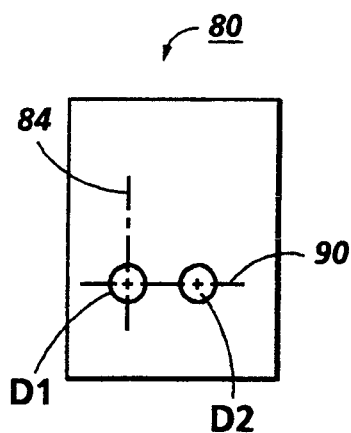
FIG. 12 shows a front view of a laser light source with a horizontal diode arrangement.
Figure 13:
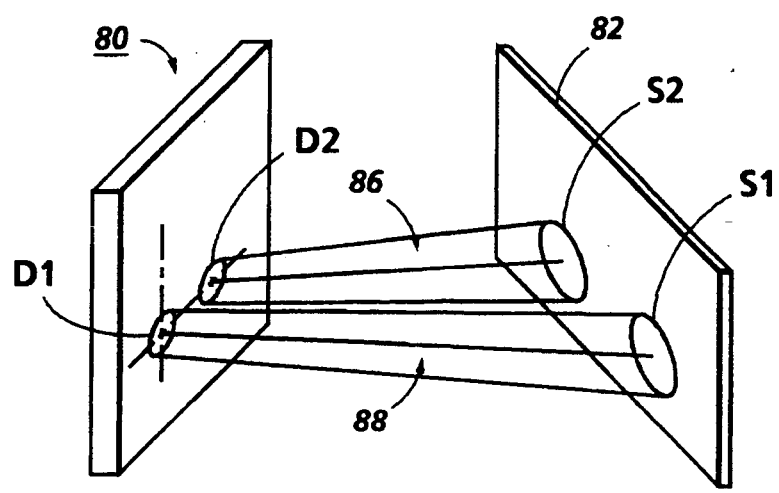
FIG. 13 shows a perspective view of the light source of FIG. 12 which generates two spots on a photoreceptor plane.
Figure 14:
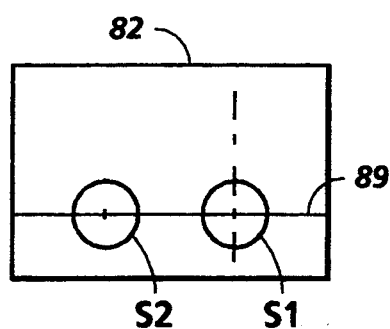
FIG. 14 shows a front view of the photoreceptor plane of FIG. 13.

Referring to FIGS. 12, 13 and 14 which are the same views as FIGS. 9, 10 and 11 respectively with different diode positions. In FIGS. 12 and 13 the diodes D1 and D2 are placed side by side on a horizontal axis 90 which is also in the direction of the scan. In this arrangement, the diodes D1 and D2 generate two spots S1 and S2 on the photoreceptor plane 82. As it can be observed, the spot S2 follows the spot S1 and both spots scan the path 89. Since the two spots S1 and S2 scan the same path, the positions of the two diodes shown in FIGS. 12 and 13 are not appropriate positions for combing two light beams.

Figure 15:
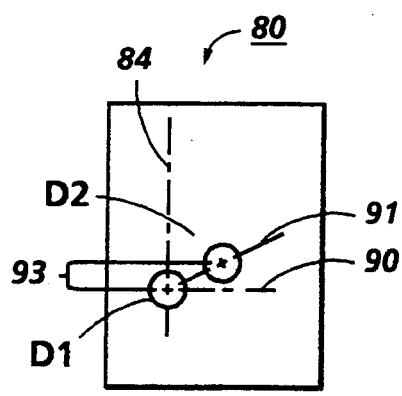
FIG. 15 shows a front view of a laser light source with offset diode arrangement.
Figure 16:
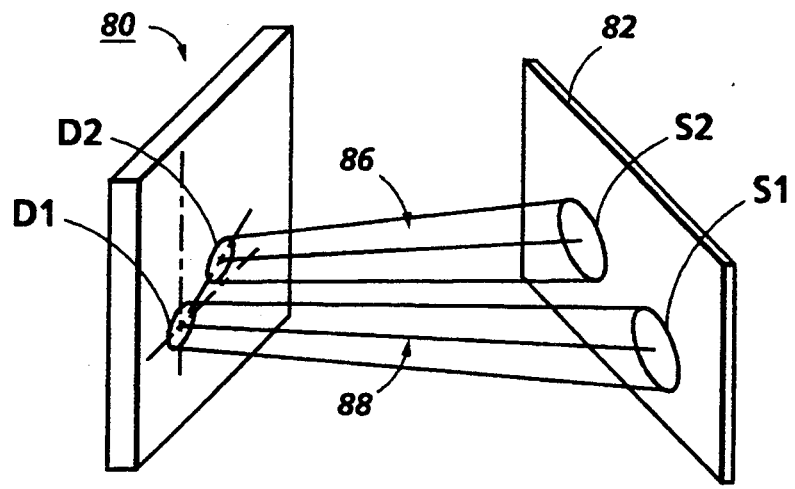
FIG. 16 shows a perspective view of the light source of FIG. 15 which generates two spots on a photoreceptor plane.
Figure 17:
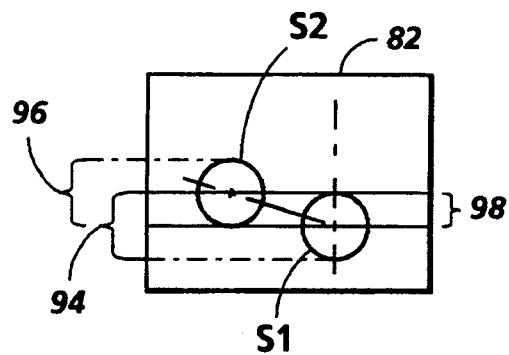
FIG. 17 shows a front view of the photoreceptor plane of FIG. 16.

Referring to FIGS. 15, 16 and 17 which are the same views as FIGS. 9, 10 and 11 respectively with different diode positions. In FIGS. 15 and 16 the diodes D1 and D2 are placed in an offset position relative to each other in such a manner that the centers of the two diodes D1 and D2 are placed on a line 91 which is at an angle to the direction of scan 90. The position of the line 91 is dependent on the required spacing between the centers of the two diodes D1 and D2 and the amount of required overlap between the two generated spots S1 and S2. In this invention, the diode pitch 93 which is the vertical distance between the two diodes D1 and D2 is selected to be FWHM/2 at the diode which provides a resulting spot with a substantially Gaussian intensity distribution.

The reason for stating FWHM/2 at the diode is to distinguish it as being smaller than the FWHM/2 of the spot at the photoreceptor plane. It is also noted that the light beam's FWHM/2 at the diode, hereinafter referred to as the diode size, is smaller than the diode itself.

Referring to FIG. 17, as it can be observed, spot S1 scans path 94 and spot S2 scans path 96 while following the spot S1. It can also be observed that the two paths 94 and 96 overlap each other over path 98. Since the scanning path of the two spots S1 and S2 partially overlap each other, the diode arrangement of FIG. 15 is suitable for combining two light beams.

The purpose of combining two light beams is to create one resulting spot which will apply one pixel onto the scan line. Therefore, the two light beams should receive the same pixel information and they should apply the pixel information onto the path in such a manner that each pixel from the top path should overlap the corresponding pixel from the bottom path to have the effect of one pixel in order to generate one scan line.

Figure 1:
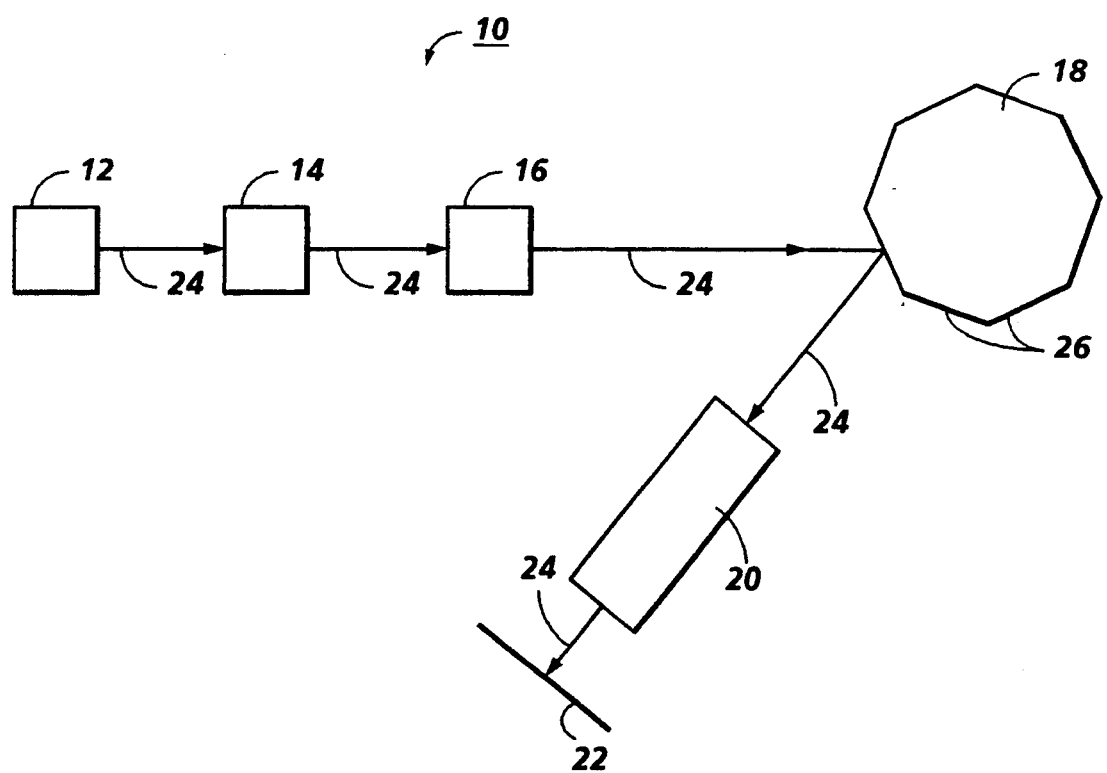
FIG. 1 is a top view of a prior art raster output scanner.

Since in the diode arrangement of FIG. 1 5, one spot follows the other spot, it is necessary to have both spots S1 and S2 start applying the pixel information to the two paths from the same starting point.

Figure 18:
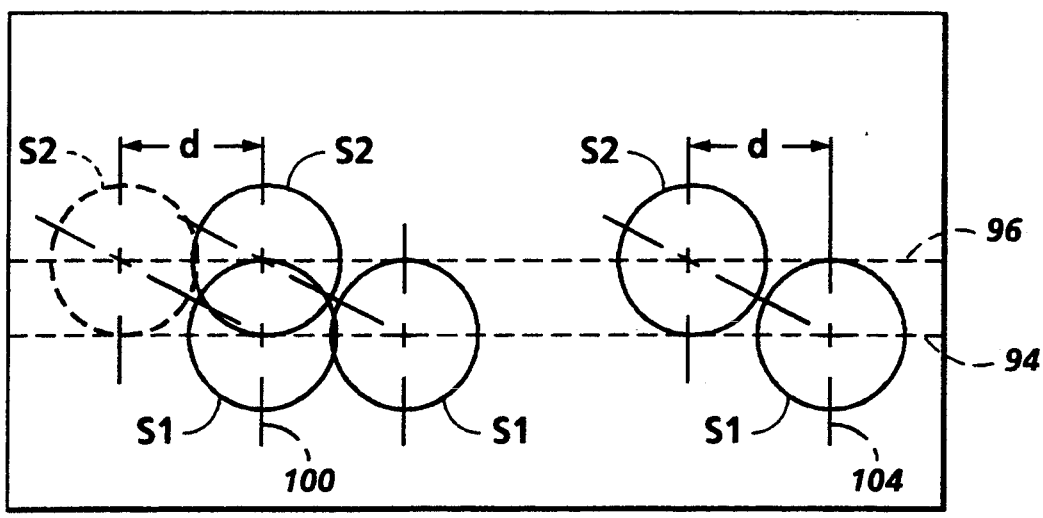
FIG. 18 shows how the two spots S1 and S2 of FIG. 17 can be synchronized to scan two partially overlapping paths in which the two spots start applying the pixel information onto the paths from the same position and stop applying the pixel information onto the paths at the same position.

Referring to FIG. 18, there is shown a magnified view of FIG. 17 while for simplicity the two paths 96 and 94 of FIG. 17 are shown by two dashed lines 96 and 94 and the space between the spots is shown with a smaller space. Referring to FIGS. 15 and 18, position 100 is the position that the leading spot S1 applies the pixel information onto the path. In order to align the pixels from the path 96 with the path 94, a delay by any well known means can be applied to the driver of the diode D2.

A delay on diode D2 will cause the modulation of the pixel information onto the light beam of the diode D2 to be delayed. With this procedure, the modulation of the pixel information onto the light beam of the diode D1 starts first and spot S1 starts to apply the pixel information from position 100 and moves on. After a delay of d in which, the spot S2 reaches the position 100, the modulation of the pixel information onto the light beam of the diode D2 starts. Therefore, the spot S2 also applies the pixel information onto the path at position 100. In this fashion when the spot S1 reaches the end of scan 104, the modulation of the pixel information onto the light beam of diode D1 will be turned OFF and the spot S2 will move on until it reaches the end of scan 104 (a time delay equal to delay d) and then the modulation of the pixel information onto the light beam of diode D2 will be turned OFF.

The amount of delay d depends on the distance between the centers of the two diodes D1 and D2 which is dependent on the required spacing between the diodes D1 and D2 that is set by the fabrication parameters. With a proper delay, the diode D2 will be delayed in such a manner that the generated spots S1 and S2 from the two diodes D1 and D2 both start applying the pixel information from a same starting point 100 and they both end applying the pixel information at the same ending point 104.

Figure 19:
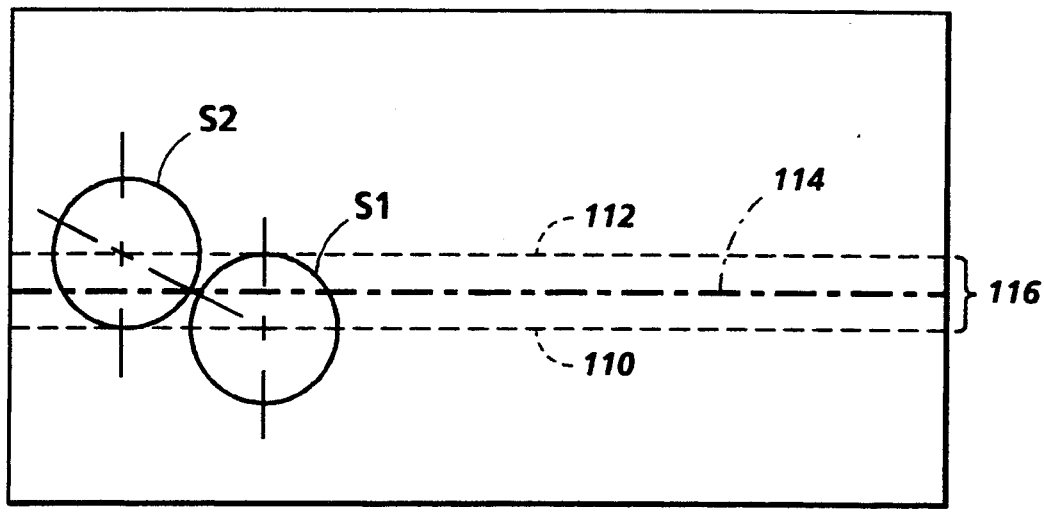
FIG. 19 shows a photoreceptor plane with two spots S1 and S2 which scan two partially overlapping paths to form one scan line.

Referring to FIG. 19, there is shown a photoreceptor plane with two spots S1 and S2 which scan two paths that partially overlap each other. For the purpose of simplicity, the path that spot S1 scans is shown by a dashed line 110 passing through the center of the spot S1 and the path that spot S2 scans is shown by dashed line 112 passing through the center of spot S2. However, when the two spots S1 and S2 are combined the resulting spot scans a path or a line shown by phantom line 114. By having two spots in this fashion, the intensity of the two light beams 86 and 88 (FIG. 16) generating the two spots S1 and S2 can be modified to move the resulting spot and therefore move the scan line 114 in the range between the centers of the two spots (spot separation 116).

As it was mentioned previously, combining two spots can correct a wobble in the range of ½ pixel. Typically in a raster scanner, the wobble is more than ½ pixel. To correct such a wobble, multiple diodes are required which at any given time either one diode or only two of them will be ON.

Figure 20:
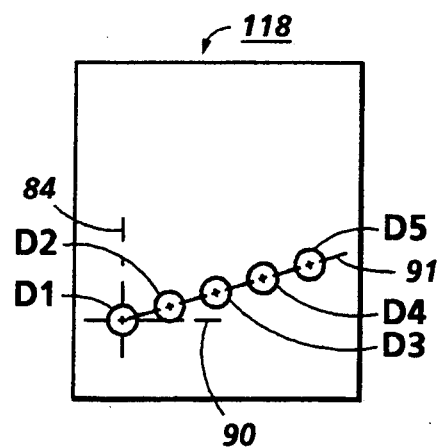
FIG. 20 shows a front view of a laser light source with multiple offset diode arrangement.
Figure 21:
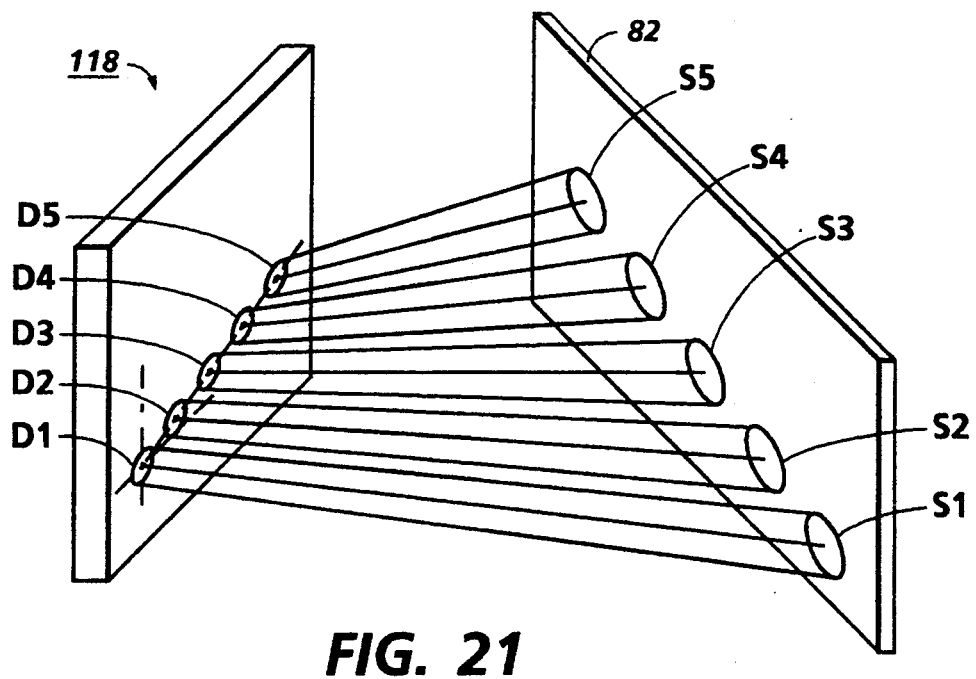
FIG. 21 shows a perspective view of the light source of FIG. 20 which generates a plurality of spots on a photoreceptor plane.
Figure 22:
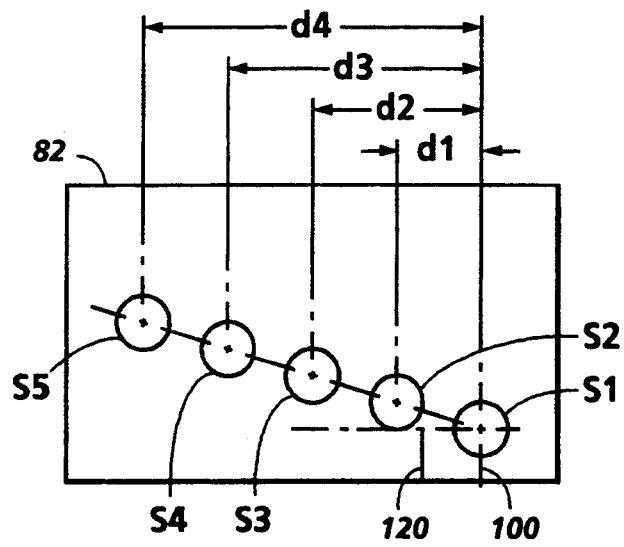
FIG. 22 shows a front view of the photoreceptor plane of FIG. 21.

Referring to FIGS. 20, 21 and 22, there are shown an arrangement of a multi-diode laser light source 118, a perspective view of the light source 118 with five diodes D1, D2, D3, D4 and D5 which generates five spots S1, S2, S3, S4 and S5 on a photoreceptor plane 82 and a front view of the photoreceptor plane 82 respectively. It should be noted that for simplicity, the optical elements between the laser light source 118 and the photoreceptor plane 82 are not shown.

Referring to FIG. 20, the D1, D2, D3, D4 and D5 are placed in an offset position relative to each other in such a manner that the centers of all the diodes are on line 91 which is at an angle to the direction of scan 90. Again as in the arrangement of FIG. 15, the position of line 91 is dependent on the required spacing between the centers of the diodes and the amount of overlap between the spots. In this arrangement, depending on the amount of the wobble, either one or two adjacent diodes will be selected to scan a line.

Referring to FIGS. 20 and 22, since the spots follow each other, again it is necessary to synchronize the starting point of all the scan lines. The position 100 (FIG. 22), which is the start of the scan for the spot S1, is considered to be the start of the scan for all the scan lines. In order to have all the spots S1, S2, S3, S4 and S5 start from the same starting position 100, the diodes D2, D3, D4 and D5 (FIG. 20) should be delayed by d1, d2, d3 and d4 (FIG. 22) respectively. With these delays, selection of any adjacent two diodes will generate a scan line which starts at position 100 (FIG. 22).

For example, by selecting the diodes D2 and D3 (FIG. 20), since the driver of the leading diode diode D2 receives a delay of d 1 (FIG. 22) and the driver of the trailing diode D3 receives a delay of d2 (FIG. 22), both diodes D2 and D3 generate two spots which scan two paths with a starting point at position 100 (FIG. 22). In the same fashion, if the diodes D4 and D5 (FIG. 20) are selected, since the driver of the leading diode D4 receives a delay of d3 (FIG. 22) and the driver of the trailing diode D5 receives a delay of d4 (FIG. 22), both diodes D4 and D5 generate two spots which scan two paths with a starting point at position 100 (FIG. 22).

Figure 23:
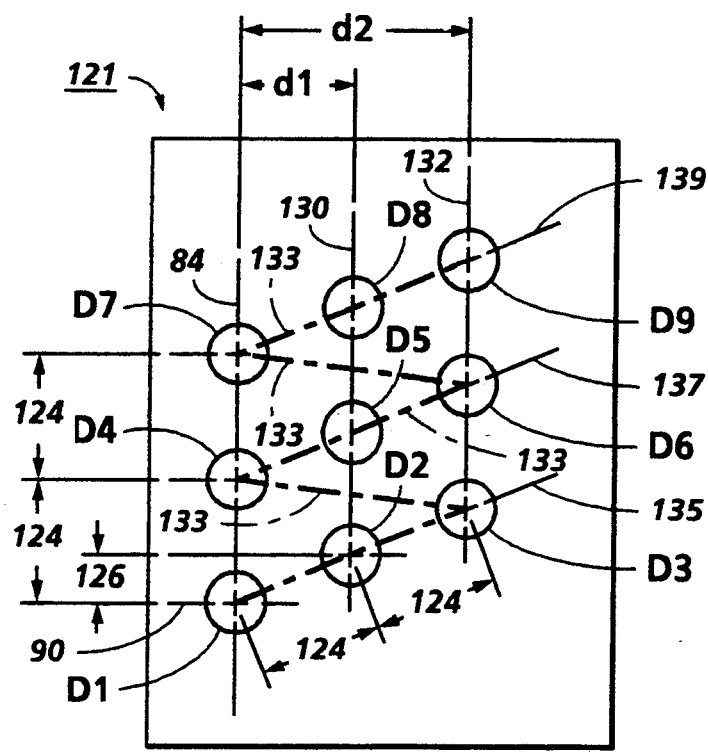
FIG. 23 shows another multi-diode laser light source with offset diode arrangement.

Referring to FIG. 23, there is shown a magnified view of multi-diode laser light source 121. In this arrangement, the diodes are staggered to provide an arrangement which needs less number of delays compared to the number of delays used in the embodiment of FIG. 1 5. The diodes D1, D2 and D3 are placed on line 135 which is at an angle to the direction of the scan 90, the diodes D4, D5 and D6 are placed on line 137 and the diodes D7, D8 and D9 are placed on line 139. The lines 137 and 139 are parallel to line 135.

The number of required columns depend on the the diode spacing 124 (the distance between the centers of the two diodes). Depending on the requirements of the fabrication technology, the diode spacing 124 may have some restrictions.

Referring back to FIG. 23, due to the requirements of the fabrication technology, the space 124 between the two diodes D1 and D4 on column 84 is large. Therefore, the two diodes can not produce two spots which can scan two partially overlapping paths. The diodes on the columns 130 and 132 are added to fill the gap between the diodes on column 84.

In this arrangement, the diodes that follow each other on the path 133 are offset relative to each other with respect to the direction of scan. Also, only the diodes that follow each other on the path 133 can be selected to generate two spots which can scan two partially overlapping paths. For example, D1 and D2, D2 and D3 or D3 and D4 can be selected as a designated diode pair.

Figure 24:
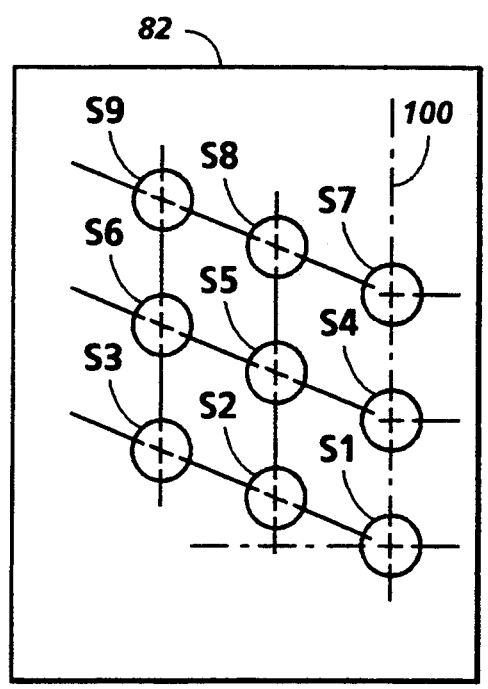
FIG. 24 shows the spots generated by the diode arrangement of FIG. 23 on a photoreceptor plane.

The diode arrangement of FIG. 23 generates the spots S1, S2, S3, S4, S5, S6, S7, S8 and S9 shown in FIG. 24. In order to have all the spots S1, S2, S3, S4, S5, S6, S7, S8 and S9 start from the same starting position 100, the diodes on column 130 should be delayed by d1 and the diodes on column 132 should be delayed by d2.

In order to design this arrangement, first the diode separation, distance 124 between the two diodes D1 and D4 on the vertical axis 84, has to be defined. This distance 124 is the required distance between the diodes which is defined by the technology. Next, the diode pitch 126, which is the vertical distance between the two centers of any two diodes which follow each other on the path 133, has to be defined. The pitch 126 is equal to the light beam's FWHM/2 at the diode which permits the generation of two spots which can scan two partially overlapping paths.

Finally, the number of the required columns has to be determined. The number of required columns is equal to the diode spacing divided by the diode pitch. For example, in FIG. 23, if the diode separation is 3.0 micron and the diode pitch is 1.0 micron, then 3/1=3 columns are required to have every two diodes, which follow each other on the path 133, scan partially overlapping paths.

Therefore, in FIG. 23, besides the first column (vertical axis 84) of the diodes D1, D4 and D7, two more column of diodes are required. Columns 84, 130 and 132 have to be spaced from each other in such a manner that the diode separation between every two diodes on any two adjacent columns that generate two partially overlapping spots have to be equal to the required diode separation 124.

It should be noted that in different diode arrangements of this invention, depending on the amount of the wobble compared to the correct position of the scan line, the position of one of the diodes might be adequate to correct the wobble. In that case, that one diode will be selected to reduce the wobble.

It should also be noted that different diode arrangements of this invention can be designed with any number of diodes that is necessary for the system.

It should further be noted that the preferred embodiment of this invention utilizes a vertical cavity surface emitting laser (VCSEL) or other surface emitting laser array. The advantage of utilizing a VCSEL array is that the light beam, generated by each diode on the VCSEL array, is substantially collimated and therefore it produces a circular spot compared to the edge emitting diode arrays which generate an elliptical spot. However, as an alternative, the edge emitting diode arrays can also be utilized to combine the light beams and the shapes of the spots can be modified, by well known methods to be substantially circular.

It should finally be noted that for the preferred embodiment of this invention the spot separation has to be FWHM/2 of a single light beam with its maximum intensity which generates a resulting spot with a substantially Gaussian distribution. However, for different applications, different spot separations may be utilized which will provide a resulting spot with an intensity distribution other than Gaussian distribution.

The aforementioned embodiment discloses different diode arrangements to combine two light beams. However, in order to correct a wobble, it is necessary to detect the position of the spots generated by the diode arrangement in comparison with the correct position of the scan line. Once the position of the spots are detected, then a proper pair of diodes can be selected to be the designated diode pair for that scan line. Also, based on the position of diodes and the position of the scan line, the intensities of the two light beams generated by the designated pair of diodes can be modified to achieve fine alignments between the two light beams and the scan line.

Figure 25:
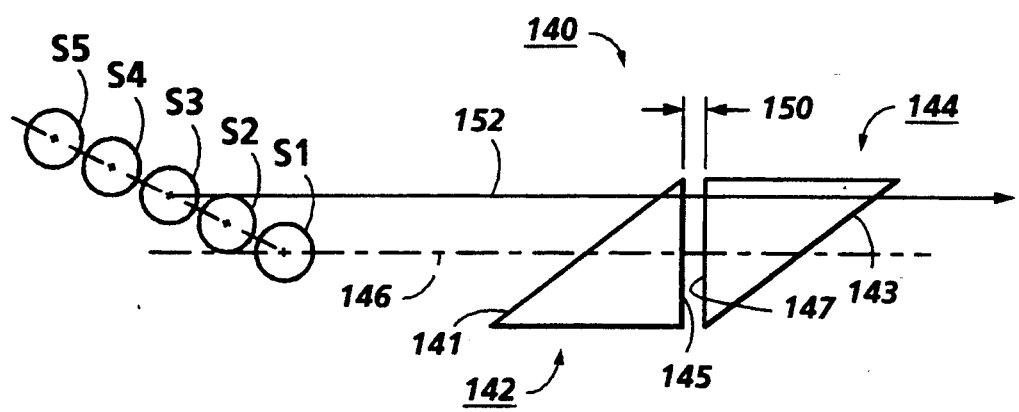
FIG. 25 shows a position detector which detects the position of the spots relative to a reference axis.

In order to detect the position of the spots compared to the scan line a position detector can be utilized. Referring to FIG. 25, there is shown a position detector 140. The position detector 140 has two elements 142 and 144. The two elements 142 and 144 can each have a triangular shape, a trapezoidal shape or any other shape with the following relationships. The two elements are placed adjacent to each other in such a manner that on a reference axis 146, the width of both elements are equal. The edge 141 of element 142 is parallel to edge 143 of the element 144. So, each element will have a varying distance between its edges scanned by a spot and such distance on one element will be different than corresponding distance on the other element except at the reference axis. The edge 145 of element 142 is adjacent to and spaced from edge 147 of the element 144 and these edges are parallel to each other. Also, the edges 145 and 147, separating the two elements 142 and 144, must be orthogonal to the scan direction I 52 to also use the crossing of the edges by a spot as a start of scan detector. This crossing will be a constant reference point in the direction of scan irrespective of the position of the spot relative to the reference axis 146.

To detect the position of the spots relative to the reference axis 146, the position detector 140 will be placed just prior to the edge of a paper under print and the spot S1 from diode D1 of any diode design will be arranged to cross the detector 140 on the reference axis 146. However, the position of the middle spot S3 is the correct position of the scan line 152, The reason for sending the spot S1 to the detector 140 is that the spot S1 is the first spot that reaches the detector 140. It should be noted that while the spot S1 is crossing the detector 140, the rest of the diodes are turned OFF.

Also, to detect the start of scan position, the position detector 140 will be placed just prior to the edge of a paper under print in such a manner that the space 150 between the two elements 142 and 144 will be coincident with the start of the scan.

In operation, if the spot S1 crosses the position detector 140 above the reference axis 146, it crosses the first element 142 at the narrower area and it crosses the second element 144 at a wider area. Therefore, the first element measures a shorter distance and the second element measures a longer distance. In contrast, if the spot S1 crosses the position detector 140 below the reference axis 146, it crosses the first element 142 at the wider area and it crosses the second element 144 at a narrower area. Therefore, the first element measures a longer distance and the second element measures a shorter distance and if the spot S1 crosses the position detector 140 on the reference axis 146, the two elements 142 and 144 measure equal distances. By comparing the distance from the two elements 142 and 144, the position of the spot S1 relative to the reference axis 146 and therefore relative to the correct position of the scan line 152 will be detected.

With this arrangement, when the spot S1 crosses the position detector 140 on the reference axis 146, then the position of the middle spot is the correct position of the scan line and therefore the middle spot should be selected to scan the line. For example, in the example shown in FIG. 25, there are five spots S1, S2, S3, S4 and S5 and if the spot S1 crosses the position detector on the reference axis 146, then the position of the spot S3 which is the middle spot is the correct position of the scan and therefore, the diode D3 (not shown) which generates the spot S3 should be selected to be the designated diode.

However, if the spot S1 crosses the position detector below the reference axis of the 146, it means that the middle spot is below the scan line and therefore there is a wobble on that scan line. Depending on how far below the reference axis 146 the spot S1 crosses the position detector, two spots from the group of spots including the middle spot and spots above the middle spot (S3, S4 and S5) or one spot from the group of spots above the middle spot (S4 and S5) will be selected to be the designated spots or spot to scan that line. Also, the diodes or the diode generating those spots or spot will be the designated diodes or diode. Furthermore, depending on the position of the two spots compared to the position of the scan line, the intensities of the two spots can be modified to achieve the fine alignment between the two spots and the scan line.

In the same manner, if the spot S1 crosses the position detector above the reference axis 146, it means that the middle spot is above the scan line and therefore there is a wobble on that scan line. Depending on how far above the reference axis 146 the spot S1 crosses the position detector, two spots from the group of spots including the middle spot and spots below the middle spot (S3, S2 and S1) or one spot from the group of spots below the middle spot (S2 and S1) will be selected to be the designated spots or spot to scan that line. Also the diodes or the diode generating those spots or spot will be the designated diodes or diode. Furthermore, depending on the position of the two spots compared to the position of the scan line, the intensities of the two spots can be modified to achieve the fine alignment between the two spots and the scan line.

It should be noted that in a system which has an even number of the spots, the position of the resulting spot from the combination of the two middle light beams, each with 50% of its maximum intensity, will be the correct position of the scan line.

Once the position of the spot S1 is detected, different approaches such as look up tables can be used to select a proper set of diodes and a proper intensity and a proper delay for each diode to provide the necessary adjustment for that scan line. With these selections, a line will be scanned at its correct position.

Figure 26:
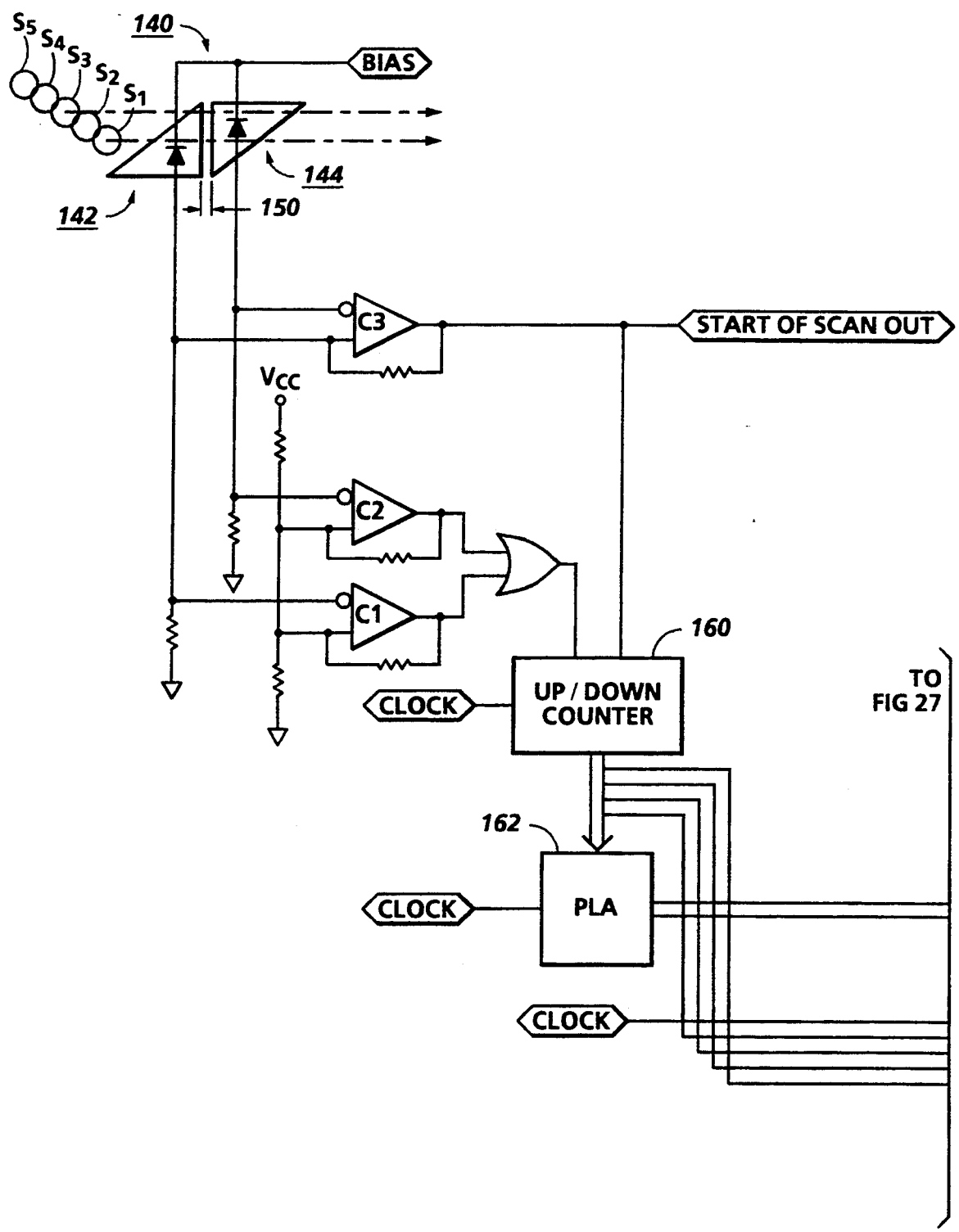
FIGS. 26 and 27 show a controlling circuit diagram for the diode arrangement of FIG. 20 which is utilized to correct the wobble on different scan lines.
Figure 27:
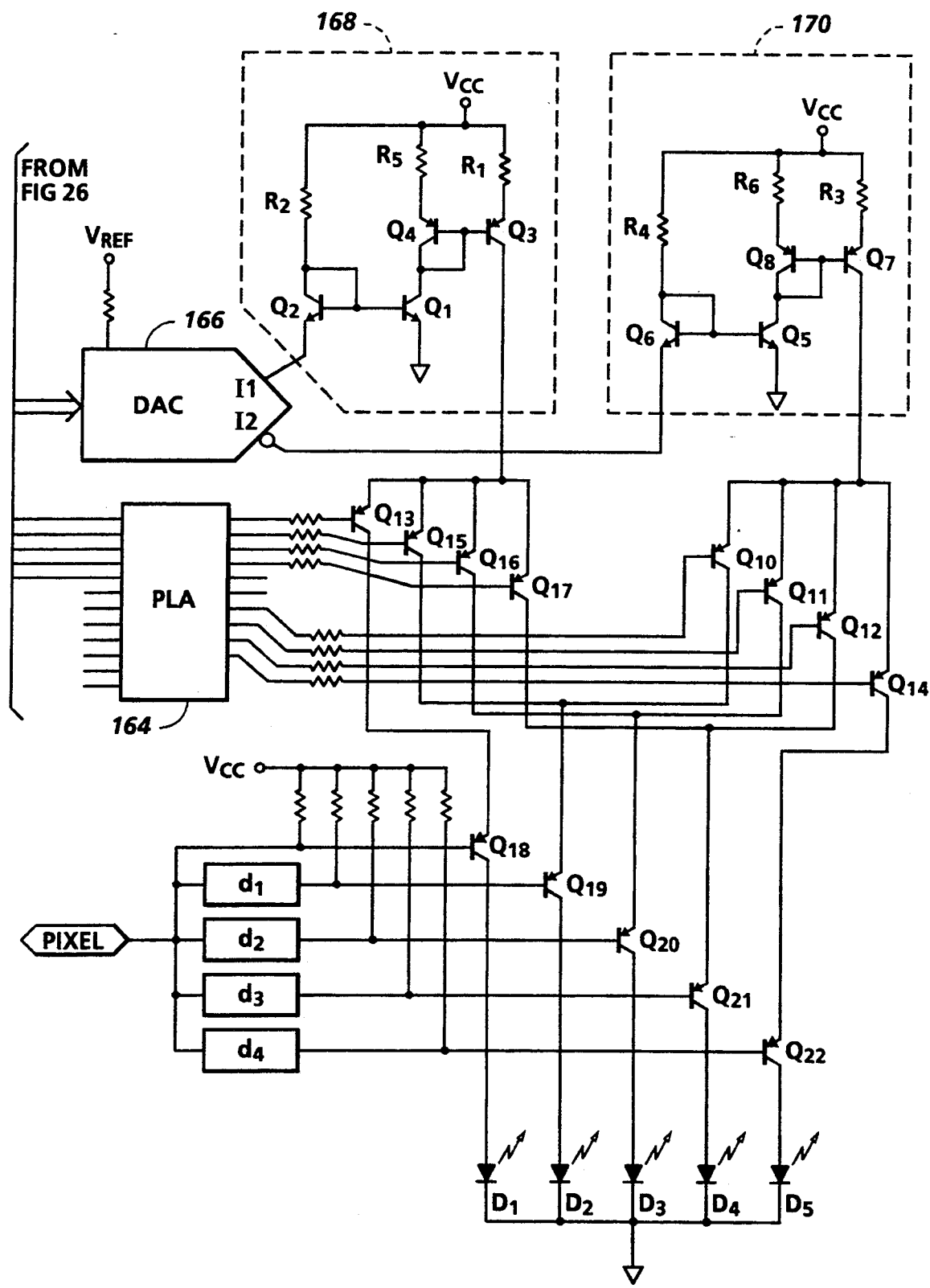

Referring to FIGS. 26 and 27, there is shown a controlling circuit diagram for one of the diode arrangements (FIG. 20) of this invention which is utilized to correct the wobble on different scan lines. The circuit shown in FIGS. 26 and 27 is designed by the well known means. Prior to selection of the proper diodes and the proper intensities, diode D1 (not shown) will be turned on and the spot S1 generated by the diode D1 will be sent to the position detector 140. As the spot S1 starts crossing each element of the position detector, the element generates a voltage and when the spot generated by the light beam is completely on the element, the element generates the maximum voltage Vm. The voltage generated by the element 142 is being compared to a reference voltage equal to Vm/2 (which represents a voltage generated by the element when the spot is half way on the element) by a comparator C1.

Referring to FIGS. 25, 26, and 27, when the spot S1 starts crossing the element 142, the element 142 generates a voltage and when this voltage reaches Vm/2, the comparator C1 switches and turns ON the up/down counter 160. The element 142 also generates a signal which through comparator C3 sends a signal to the up/down counter 160 causing the up/down counter 160 to start counting up. While the up/down counter 160 is counting up, it measures the distance which is traveled by the light beam (spot S1) from edge 141 to edge 145 (FIG. 25) of element 142.

When the spot S1 starts exiting the element 142, the voltage generated by the element 142 starts decreasing and as the spot S1 exits the element 142, it starts crossing the space 150 and the element 144. Therefore, the voltage generated by the element 142 starts decreasing and the voltage generated by the element 144 starts increasing. As a result, comparator C1 switches OFF and the comparator C2, which has a reference level equal Vm/2, turns ON keeping the up/down counter 160 ON.

Also, as the spot S1 crosses the space 150, the comparator C3, which compares the voltage generated by the element 142 with the voltage generated by the element 144, switches. When the comparator C3 switches, it indicates the start of the scan. The start of scan signal generated by C3 is also used to flag the up/down counter 160 to start counting down. While the up/down counter 160 is counting down, it measures the distance which is traveled by the light beam (spot S1) from edge 147 to edge 143 of element 144. The up/down counter 160 stops counting when the spot S1 exits the element 144.

Depending on the position of the spot S1 compared to the reference axis 146 (FIG. 25), the spot S1 may cross the optical element 142 in a narrower or a wider area than the area of the element 144. This will cause a different count while the spot S1 crosses each element.

If the spot S1 crosses the elements 142 and 144 on the reference axis 146, the count for the two elements will be the same. Therefore, the up/down counter 160, which counts up for the element 142 and count down for element 144, will have a zero count when the spot S1 exits the element 144.

However, when the spot S1 crosses the elements 142 and 144, above or below the reference axis 146, when the light beam exits the element 144, there will be a count left in the up/down counter 160.

The resulting count from the up/down counter 160 is sent to two programmable logic arrays (PLA) 162 and 164, Depending on the count, the PLA 162 provides the proper intensities and PLA 164 provides the proper selection of the diodes.

A digital to analog converter 166 converts the digital intensity signal for the selected one diode into an analog signal I1 or I2 depending on the selected diode or it converts the two digital intensity signals for the two selected offset diodes into two analog signals I1 and I2, one for each of the two light beams that will be generated. The current amplifier 168 amplifies the current signal I1 and the current amplifier 170 amplifies the current signal I2.

Depending on the selection of the diodes from the PLA 164, the switches Q10 through Q17 will turn ON the proper diodes D1 through D5 and activate the modulating switches Q18 through Q22. The switches Q18 through Q22 are responsible for modulating the pixel information onto the light beam generated by the diodes D1 through D5. The delays d1, d2, d3 and d4 are responsible to apply a proper delay to the pixel information of each diode before modulation.

It should be noted that different embodiments of this invention require different delays. Depending on the required delay for each embodiment, the modulating portion of the circuit can be modified to provide the required delay for that specific embodiment.

It should also be noted that the circuit shown in FIGS. 26 and 27 can be designed in many different ways with different number of diodes.

The position detector of this invention in conjunction with any diode design disclosed in the various embodiments of this invention provide a system which can correct the wobble of a scanning system.

Since the disclosed embodiments of this invention are capable of correcting any wobble within any range, the conventional wobble correcting optics will no longer be needed. Typically the conventional wobble correcting optics are the only optical elements which require cylindrical lenses. Therefore, by eliminating the conventional wobble correcting optics, the cylindrical lenses utilized in a raster scanner for correcting wobble will be eliminated.

Figure 28:
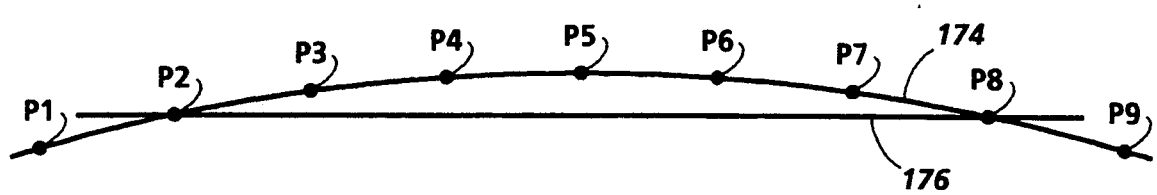
FIG. 28 shows the displacement of the pixels of a bowed scan line compared to a straight scan line.

A raster scanning system can also utilize different embodiments of this invention to correct a bow of a scan line. Referring to FIG. 28, to correct a bow of a scan line, during assembly, the position of each pixel (i.e pixel P3 or P4) on a bowed scan line 174 relative to a straight scan line 176 will be measured and based on the measured data from each pixel, the required correction will be defined which then the correction data will be stored in a memory. Once the correction data is stored, every time it is needed to modulate a pixel onto the light beam, the correction data for that pixel will be retrieved and based on the required correction for that pixel, either a single diode or a proper pair of diodes with proper intensities will be selected. With this approach a bow of a scan line can be substantially reduced.

Figure 29:
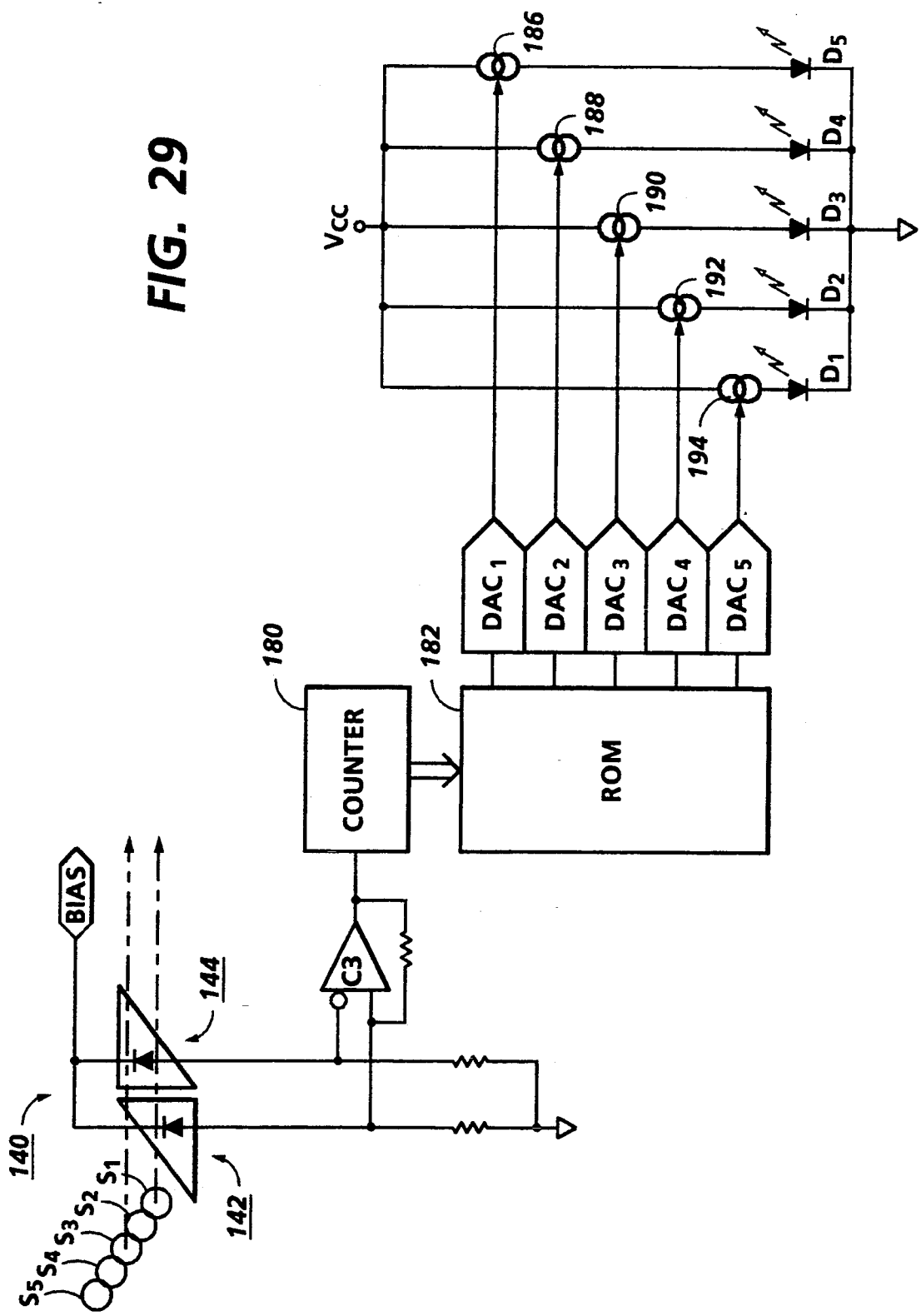
FIG. 29 shows a controlling circuit diagram for the diode arrangement of FIG. 20 which is utilized to correct the bow of a scan line.

Referring to FIG. 29, there is shown a controlling circuit diagram for one of the diode arrangements (FIG. 20) of this invention which is utilized to correct the bow of a scan line. The position detector 140 will be used to indicate the start of the scan. As the spot S1 crosses the element 142 to element 144, the comparator C3 changes state which provides the start of the scan. Once the start of the scan is flagged, a counter 180 starts counting until it counts to the position in which the pixel information should be applied to the scan line. Any count beyond the position in which the pixel information should be applied to the scan line will be called pixel count. The counts from the counter 180 are sent to a ROM 182.

Based on the correction data from the bow measurement of each pixel, the ROM 182 is programmed to provide the proper intensities and diode selection for each pixel. The counter 180 indicates the pixel count and the pixel count addresses the ROM 182 to send out the diode selection and the intensity values.

The output of the ROM 182 will be sent out to digital to analog convertors DAC1, DAC2, DAC3, DAC4 and DAC5. Only the selected DACs which receive a value from the ROM 182, convert the digital intensity values to analog intensity values, The analog intensity values from the selected DACs will activate the corresponding voltage controller current sources 186, 188, 190, 192 and 194. The activated voltage controller current sources will provide proper currents to corresponding laser diodes D1, D2, D3, D4 and D5 to emit light beams with the required intensities.

What is claimed is:

1. A sensor for a raster scanner, comprising:

a first and a second element for receiving a scanning beam thereacross;

each of said first and second elements having a first edge and a second edge;

said first and said second elements having a common reference axis in the direction of scan;

said second edge of said first element being spaced from said first edge of said first element in the direction of scan on the reference axis;

said second edge of said second element being spaced from said first edge of said second element in the direction of scan on the reference axis;

the distance between said first edge and said second edge of said first element on the reference axis being equal to the distance between said first edge and said second edge of said second element on the reference axis;

said first edge of said first element being parallel to said second edge of said second element, but not parallel to said second edge of said first element and said first edge of said second element;

said second edge of said first element being adjacent to and spaced from said first edge of said second element;

said second edge of said first element being parallel to said first edge of said second element and being orthogonal to the direction of scan;

means for measuring the distance that the light beam travels from the first edge of the first element to the second edge of first element and for measuring the distance that the light beam travels from the first edge of the second element to the second edge of second element;

a position detecting means being operably connected to said measuring means for comparing the distance traveled by the light beam across each of said elements to determine the position of the light beam relative to the reference axis;

start of scan detecting means operably connected to said first element and said second element for detecting the light beam crossing the space between said first and said second elements.

2. The sensor for a raster scanner as recited in claim 1, wherein said position detecting means includes an up/down counter.

* * * * *